United States Patent
Everett et al.

(10) Patent No.: US 6,296,772 B1
(45) Date of Patent: Oct. 2, 2001

(54) SPLIT ION EXCHANGE SYSTEM AND METHOD OF OPERATING

(75) Inventors: Rollo J. Everett, Worth; Lawrence R. Schwab, Orland Park; Carlos G. Escobar, Lisle, all of IL (US)

(73) Assignee: Corn Products International, Inc., Bedford Park, IL (US)

( * ) Notice: Subject to any disclaimer, the term of this patent is extended or adjusted under 35 U.S.C. 154(b) by 0 days.

(21) Appl. No.: 09/533,528

(22) Filed: Mar. 23, 2000

(51) Int. Cl.[7] ................................................... B01J 49/00
(52) U.S. Cl. ......................... 210/670; 127/46.2; 210/685
(58) Field of Search ........................... 127/46.2; 210/670, 210/676, 685, 284; 521/26

(56) References Cited

U.S. PATENT DOCUMENTS

| | | | |
|---|---|---|---|
| 2,403,177 | 7/1946 | Gustafson | 127/46 |
| 2,413,844 | 1/1947 | Rawlings | 127/46 |
| 2,578,938 | 12/1951 | Kunin et al. | 127/46 |
| 2,599,545 | 6/1952 | Egan et al. | 196/147 |
| 3,257,314 | 6/1966 | Kitchen | 210/30 |
| 3,351,488 | 11/1967 | Zievers et al. | 127/9 |
| 3,652,254 | 3/1972 | Knudsen | 71/34 |
| 3,870,033 | * 3/1975 | Faylor et al. | 210/900 |
| 3,985,648 | * 10/1976 | Casolo | 210/686 |
| 4,198,296 | 4/1980 | Doumas et al. | 210/29 |
| 4,383,920 | * 5/1983 | Muller et al. | 210/284 |
| 4,412,866 | 11/1983 | Schoenrock et al. | 127/46.2 |
| 4,422,881 | 12/1983 | Devos et al. | 127/46.1 |
| 4,443,267 | 4/1984 | Pansolli et al. | 127/46.2 |
| 4,472,203 | 9/1984 | Miyahara et al. | 127/46.2 |
| 4,746,368 | 5/1988 | Frank et al. | 127/55 |
| 4,968,353 | 11/1990 | Kawasaki et al. | 127/46.2 |
| 5,069,779 | 12/1991 | Brown et al. | 210/87 |
| 5,071,547 | 12/1991 | Cazer et al. | 210/198.1 |
| 5,073,255 | 12/1991 | Chili et al. | 210/96.1 |
| 5,116,511 | 5/1992 | Green et al. | 210/673 |
| 5,300,230 | 4/1994 | Brane et al. | 210/662 |
| 5,405,534 | 4/1995 | Ishida et al. | 210/662 |

* cited by examiner

*Primary Examiner*—Ivars Cintins
(74) *Attorney, Agent, or Firm*—Norris, McLaughlin & Marcus

(57) ABSTRACT

An ion exchange system for use in purifying sweetener solutions manufactured in a corn wet milling plant and a method of operating the system. The sweetener solution is passed under pressure through a plurality of ion exchange unit pairs configured to operate in both a parallel and series configuration. This configuration and method of operation has resulted in increased hydraulic capacity, a reduction in system operating pressures, an increased efficiency of impurity adsorption and an increase in the time between regeneration cycles.

14 Claims, 5 Drawing Sheets

SPLIT ION EXCHANGE SYSTEM AND METHOD OF OPERATING

BACKGROUND OF THE INVENTION

1. Field of the Invention

The present invention relates generally to ion exchange systems which remove undesirable components from liquid solutions. It relates more particularly to a unique method of configuring and operating an ion exchange system whereby the hydraulic capacity of the ion exchange system is increased and the efficiency of impurity adsorption is improved. Although the method of the present invention has many different applications, it is described herein primarily as used in the treatment of sweetener solutions manufactured in a corn wet milling plant.

2. Description of the Related Art

Ion exchange is the process of removing unwanted ions from a solution by transferring them to a solid material, called an ion exchange resin, which accepts them while returning to the solution an equivalent number of preferred ions stored on the ion exchange resin. Ion exchange systems which involve the passing of a liquid solution containing unwanted ions such as organics, hardness, alkalinity, iron and manganese through an ion exchange unit so as to purify the liquid are well known in the water conditioning, metal finishing and paper industries. Such processes are sometimes referred to as adsorber systems, and the process whereby dissolved constituents in the form of unwanted ions are separated from an aqueous solution by passage through an ion exchange resin or adsorber bed is sometimes referred to as adsorptive separation.

These processes generally involve passing an aqueous solution, the influent stream, which contains the undesirable constituents or impurities through ion exchange units which are configured in pairs and connected in series to each other. Each pair typically consists of one ion exchange unit which contains a cationic resin bed and a second ion exchange unit which contains an anionic resin bed. The cationic resin contains negatively charged sites and takes up positively charged ions from the solution. Anion exchangers have positively charged sites and, consequently, take up negative ions. As the influent stream passes through the first or primary ion exchange unit pair, undesirable constituents in the influent are attracted to and adsorbed onto the resin beds and thus are removed from the liquid being treated. As the solution leaves the primary pair and enters the second ion exchange unit pair, the concentration of the constituents to be removed and which are available to be adsorbed decreases by virtue of the removal of some of the constituents within the first ion exchanger pair. The resin bed within an ion exchange unit has a limited capacity for the storage of ions, called its exchange capacity; because of this, the resin eventually becomes depleted of its desirable ions and instead becomes saturated with unwanted ions. Therefore, as more and more of the solution passes in series first through the primary and then through the secondary ion exchanger unit pair, the exchange capacity of the resin within each pair becomes depleted or exhausted, thereby reducing its effectiveness at adsorbing the impurities. Because the concentration of these constituents is greatest when the influent contacts the primary ion exchange unit pair, it is the resin within the primary pair which typically becomes exhausted first.

To restore the effectiveness of the ion exchange operation, the resin bed within an ion exchange unit must be regenerated through a process step which removes the adsorbed constituent from the resin. The resin bed is generally washed with a strong regenerating solution containing the desirable species of ions, and these ions then replace the accumulated undesirable ions, returning the exchange material or resin to a useable condition. This operation is a cyclic chemical process and the complete cycle usually includes backwashing, regeneration, rinsing, and returning the exchanger to service. Typically, the ion exchanger pair to be regenerated is removed from service while it is being regenerated and a previously regenerated exchanger pair which was off-stream is brought back on-line. Thus, in a typical operation the primary pair of exchangers becomes exhausted first and are removed from service so they can be regenerated. The secondary pair of exchangers then moves into the primary pair position and the previously off-line regenerated ion exchanger pair comes back on-line in the secondary pair position where it is hydraulically connected, in series, to the exchangers now occupying the primary position.

U.S. Pat. No. 2,413,844 to Rawlings dated Jan. 7, 1947 discloses a process for the ion exchange treatment of sugar utilizing a method of operation of the kind referred to above. In the operation of the invention to Rawlings, three ion exchanger stations are configured in series. When the first ion exchanger resin bed has reached a predetermined degree of exhaustion, it is removed from the process stream and the next ion exchanger bed in the series, which is less exhausted, is made to operate in place of the first. The third bed, which is still less exhausted, is then caused to function in the second place while a new or regenerated bed is configured to operate in the third place. The system then continues to operate again until the exhaustion of the first bed necessitates a change. Thus, in a typical operation of the invention of Rawlings, the primary ion exchanger pair is removed from service to be regenerated. The secondary pair then moves into the primary pair position, the third pair moves into the secondary position, and a previously off-line regeneration pair moves into the third position.

U.S. Pat. No. 2,578,938 to Kunin et al. dated Dec. 18, 1951 discloses a process pertaining to the deionization of sugar solutions. Therein, a plurality of ion exchange beds are again operated in series with the first bed, after it becomes exhausted, being removed from service for regeneration and a fresh ion exchanger added to the end of the series.

Similarly, U.S. Pat. No. 4,968,353 to Kawasaki et al. dated Nov. 6, 1990 discloses an ion exchange refining system for sugar liquor comprising three types of adsorption units, called towers, which are operated in series. These three types of adsorption towers are used as a pre-stage adsorption tower, a post-stage adsorption tower and an adsorption tower for regeneration. The sugar liquor is continuously passed from the pre-stage adsorption tower to the post-stage adsorption tower. The lowering of the refining capacity of the post-stage adsorption tower is sensed to shift the pre-stage adsorption tower to the adsorption tower for regeneration, while simultaneously shifting the post-stage adsorption tower and the adsorption tower for regeneration to the pre-stage adsorption tower and to the post-stage adsorption tower, respectively. Thus, in the invention of Kawasaki, as in the invention of Rawlings, the ion exchange units, after their regeneration, are moved countercurrent to the influent flow, that is, from the third to the second to the primary position before once again being regenerated.

U.S. Pat. No. 5,116,511 to Green et al. dated May 26, 1992 discloses a water treatment system for removing metal ions from water using a plurality of ion exchange columns operated in series and a method for cleaning the system. In this invention at least two columns are used to purify water while a third column is being regenerated. When the first or lead column in the water purification process becomes saturated with metal ions it is removed from the process stream so it can be regenerated. The second column is advanced to the position of the first column and a previously-cleaned column is moved into the second position. Thus, the system of this invention operates by rotating columns between purification and cleaning stages.

Not all ion exchange systems are operated in series. For example, U.S. Pat. No. 5,073,255 to Chili et al. discloses a water treatment system apparatus having at least a first and second water treatment tank in parallel flow relation wherein the tanks are regenerated in an alternating, intermittent manner. That is, raw water in branched, parallel flow is passed through a plurality of water treatment tanks. As the process proceeds, at least one of the tanks is disconnected and taken out of service while it is automatically regenerated. During this process treated water is continuously available by means of the other tank(s) which remain in operation. Thereafter, the tank automatically regenerated is placed back into service and a second tank is automatically disconnected from service and regenerated. The process thus proceeds in a similar manner. Thus a water treatment apparatus is provided in which multiple tanks, in parallel flow relation, may be automatically regenerated.

The invention of Brane et al. (U.S. Pat. No. 5,300,230) dated Apr. 5, 1994 also discloses a method for operating a water treatment system having a plurality of ion exchange units connected in parallel flow relation which are cyclically regenerated.

The invention of Brown et al. (U.S. Pat. No. 5,069,779) dated Dec. 3, 1991 also discloses a water treatment system having multiple treatment tanks maintained in a parallel flow relationship and a control arrangement for regenerating the resin tanks without substantially reducing the flow rate through the treatment system during a regeneration cycle.

The present invention relates to the removal of impurities from sweetener solutions using an ion exchange system but configured and operated in a manner not known in the prior art.

SUMMARY OF THE INVENTION

In the ion exchange systems of the prior art, an ion exchange unit requiring regeneration is removed from service, regenerated, and not returned to service until an on-line ion exchange unit becomes exhausted and requires replacement. In the present invention, the regenerated ion exchange unit does not remain idle and off-line after regeneration but is instead immediately returned to service by reconfiguring the ion exchange system to operate in both a parallel and series configuration. This configuration and method of operation has resulted in increased hydraulic capacity of the ion exchange system, a reduction in the ion exchange system operating pressures, an increased efficiency of impurity adsorption and, in one embodiment, an increase in the time before an ion exchange unit requires regeneration.

It is therefore an object of the present invention to provide a new method for operating an ion exchange system.

It is another object of the present invention to provide a new method for operating an ion exchange system which reduces the pressure drop through the ion exchange system and increases the flowrate through the system.

It is a further object of the present invention to provide a new method for operating an ion exchange system which increases the amount of time between regeneration cycles of an ion exchange bed.

It is a further object of the present invention to provide a new method of operating an ion exchange system which increases the efficiency of impurity adsorption.

It is a still further object of the present invention to provide a new method of operating an ion exchange system treating a sweetener solution. The term "sweetener solution" as used herein is meant to include solutions of fructose, dextrose, corn syrups, maltodextrins or sucrose.

In accordance with the foregoing objects, a new method of configuring and operating an ion exchange system is disclosed. Briefly, the above and further objects are realized in accordance with the present invention by providing an ion exchange system consisting of at least three pairs of ion exchange units. Each ion exchange unit is identical in construction. The first pair of units is comprised of a cation ion exchanger and an anion ion exchanger connected in series to each other. The first pair of units occupies the Primary Position in the initial ion exchange system configuration. The second pair of units is also comprised of a cation ion exchanger and an anion ion exchanger which are connected in series to one another. The second pair of units occupies the Secondary Position in the initial configuration of the ion exchange system. The first pair of units is serially interconnected with the second pair of units. A third pair of cation and anion ion exchangers, which are connected in series to each other, is off-line and are being regenerated in the initial configuration of the ion exchange system. The third pair of units initially occupies the Regeneration Position.

In the initial configuration of the ion exchange system of the present invention, a supply liquor comprised of a liquid sweetener solution containing impurities in ionic form flows through a conduit and enters the first pair of ion exchange units located in the Primary Position where some portion of undesirable ions are removed from the solution. After passing through the first pair of units the sweetener solution, under pressure, enters by means of a second conduit the second pair of ion exchange units in the Secondary Position where additional removal of unwanted ions occurs. The solution leaving the second pair of units, the effluent, constitutes a desirable end product. The third pair of ion exchange units, occupying the Regeneration Position, is initially off-line while they are being regenerated. Once regeneration of the third pair is complete, they are placed on-line in the Secondary Position. The second pair of units, which occupied the Secondary Position, is reconfigured to operate in parallel with the first pair of units in the Primary Position. The operation of the ion exchange system continues using this configuration of the three pairs of ion exchange units until such time as the first pair of units, now configured to operate in parallel with the second pair of units in the Primary Position, becomes exhausted. At that time the first pair of units is placed off-line for regeneration in the Regeneration Position, leaving the second pair of units, in the Primary Position, and the third pair of units, in the Secondary Position, to operate in series. When the first pair of units, which are now in the Regeneration Position, have been regenerated they are placed back on line, now in the Secondary Position, and the third pair of units, which had been in the Secondary Position, is moved into the Primary Position to operate in parallel in the Primary Position with the second pair of units.

By operating the ion exchange system in the method disclosed above, it was surprisingly discovered that the total pressure drop across the ion exchange system was significantly decreased and an increase in flow rate through the ion exchange system could be achieved. It was further surprisingly discovered that when the flowrate through an ion exchange system configured according to the present invention was not permitted to be increased either due to upstream hydraulic flow constraints or by the system operator, there was a significant increase in the length of time before a pair of ion exchange units became exhausted and required regeneration. It was also surprisingly discovered that operating an ion exchange system in the manner disclosed increased the efficiency of impurity adsorption on the ion exchanger resin.

Further objects and advantages will be readily apparent to those skilled in the art and a better understanding of the present invention may be had by reference to the following detailed description taken in connection with the following drawings.

DETAILED DESCRIPTION OF THE INVENTION

Figure 1:
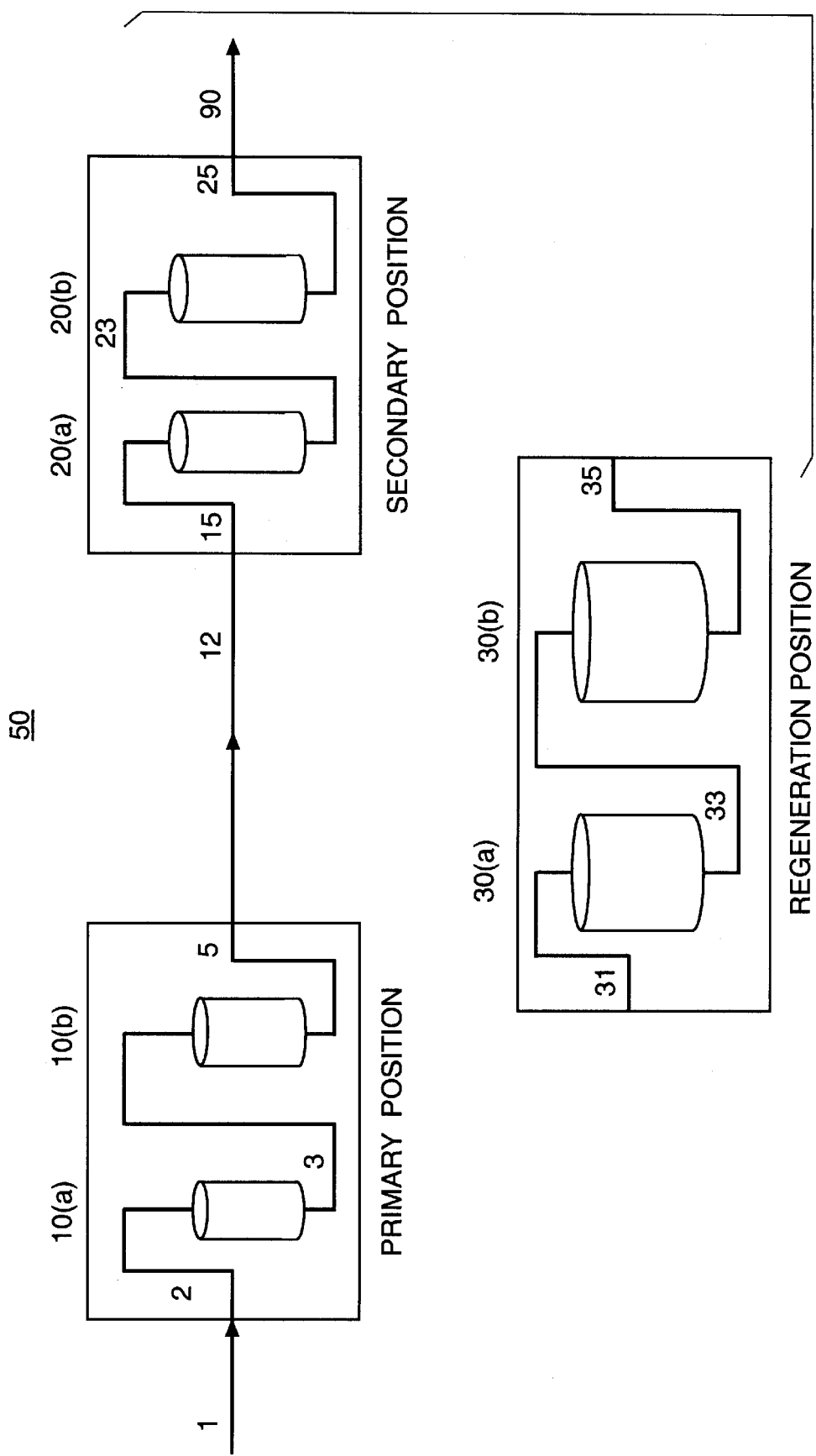
FIG. 1 is a schematic illustration of the initial configuration of the ion exchange system configuration of the present invention with the third pair of ion exchange units off-line for regeneration and the first and second pairs of units operating in series.

Referring now to FIG. 1, there is shown an ion exchange system 50 comprised of a plurality of ion exchange units which are identical in construction, some of which contain a cationic resin bed, 10(a), 20(a), 30(a), and others which contain an anionic resin bed, 10(b), 20(b) and 30(b). The size and capacity of the ion exchange units are identical. In the initial configuration of the ion exchange system 50, the first pair of units 10(a) and 10(b) occupy a Primary Position and are connected to one another in series by means of a conduit 3. Connected to unit 10(a) is an inlet line 2 through which the supply liquor 1, which may be a fructose solution or other sweetener solution, is pumped and fed under pressure into either the top or side of cation ion exchange unit 10(a). Whether the solution enters the top or the side of cation ion exchange unit 10(a) is not critical to the invention. After flowing through unit 10(a) where some portion of the impurities in the supply liquor are removed, the liquor flows under pressure to anion ion exchange unit 10(b) by means of a conduit 3. Whether the liquor enters the top or the side of unit 10(b) is not critical to the invention. The liquor then flows through unit 10(b), where an additional quantity of impurities are removed, and exits unit 10(b) by means of a conduit 5.

A second pair of ion exchange units, 20(a) and 20(b), occupy the Secondary Position in the initial configuration illustrated in FIG. 1. The second pair of units are connected to each other in series by means of conduit 23. The units occupying the Primary Position and the units occupying the Secondary Position are hydraulically connected by means of conduit 12. After exiting the first pair of units 10(a) and 10(b), the liquor is fed under pressure into the top or side of cation exchange unit 20(a) through conduit 15. Whether the liquor enters the top or side of unit 20(a) is not critical to the invention. After flowing through unit 20(a), where more impurities from the liquor are removed, the liquor flows, still under pressure, to anion exchange unit 20(b) by means of a conduit 23. Whether the liquor enters unit 20(b) through either the top or side of the unit is not critical to the invention. The liquor then flows through unit 20(b) and exits this unit in the form of a desirable end product by means of a conduit 25 which in turn is in hydraulic communication with another conduit 90.

In this initial configuration of ion exchange units, the third pair of units 30(a) and 30(b), which are connected to each other in series by a conduit means 33, occupy the Regeneration Position and are off-line while being regenerated for future use. In practice it was observed that regeneration of the third pair of units 30(a), 30(b) would require about 10 to 12 hours; however, the ion exchange units 10(a), 10(b) occupying the Primary Position would not become exhausted for about an additional 30 hours. The units 30(a), 30(b) occupying the Regeneration Position would not be placed back into service until the first pair of units 10(a) and 10(b) were exhausted. To resolve this limitation and take advantage of the idle time after regeneration of the units 30(a), 30(b) in the Regeneration Position was completed, the method of the present invention was used to reconfigure the entire ion exchange system 50 in the manner illustrated in FIG. 2.

Figure 2:
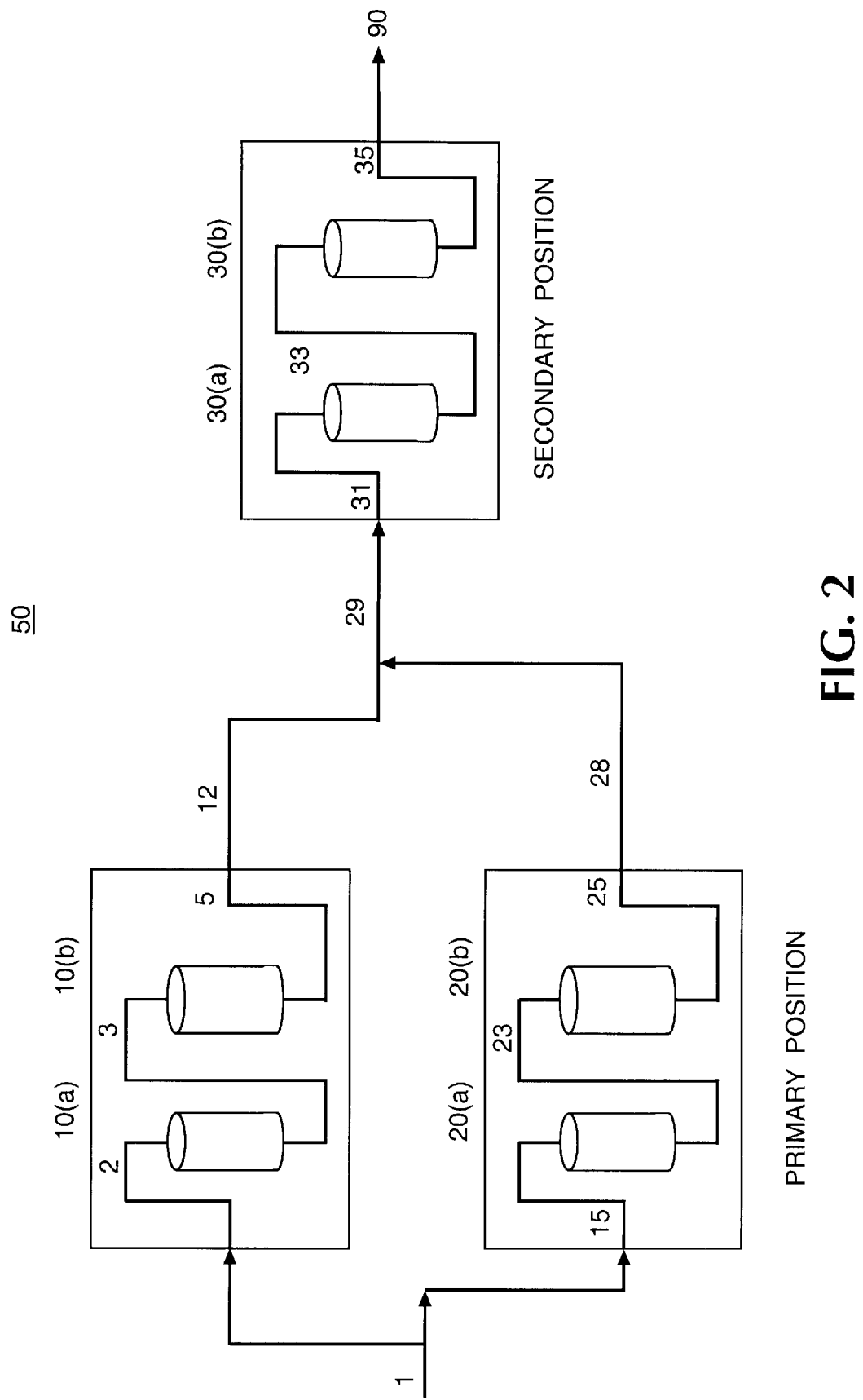
FIG. 2 is a schematic illustration of the ion exchange system configuration of the present invention with the first and second pair of ion exchange units operated in parallel and the third pair of ion exchange units returned to service.

Referring now to FIG. 2, there is shown an ion exchange system 50 reconfigured in accordance with the method of the present invention. Immediately after being regenerated, the pair of cation and anion ion exchange units 30(a) and 30(b) formerly occupying the Regeneration Position are moved into the Secondary Position. Simultaneously, the pair of cation and anion ion exchange units 20(a) and 20(b) formerly occupying the Secondary Position are moved into the Primary Position where they now receive the supply liquor 1 in parallel with the pair of cation and anion ion exchange units 10(a) and 10(b) already in the Primary Position. In this configuration the supply liquor 1 is split between the two pairs of ion exchange units, 10(a), 10(b) and 20(a), 20(b), which occupy the Primary Position. The supply liquor 1 is pumped and fed under pressure into the ion exchange units 10(a) and 20(a) by means of conduits 2 and 15, respectively. After flowing in parallel through units 10(a) and 20(a), where some portion of the impurities in the liquor are removed, the liquor flows under pressure to anion ion exchange units 10(b) and 20(b) by means of conduits 3 and 23. The liquor then flows through units 10(b) and 20(b), where an additional quantity of impurities are removed, and exits units 10(b) and 20(b) by means of conduits 5 and 25, such conduits being in hydraulic communication with conduits 12 and 28, respectively, which are interconnected with conduit means 29. The liquor then further flows, under pressure, into either the top or the side of cation exchange unit 30(a) which is in the Secondary Position, by means of conduit 31. Whether the liquor enters the top or side portion of unit 30(a) is not critical to the invention. The liquor exits unit 30(a) by means of a conduit 33 which feeds the liquor into either the top or side of unit 30(b). Whether the liquor enters the top or side of unit 30(b) is not critical to the invention. The liquor, now in the form of a desirable end product, exits the anion ion exchange unit 30(b) through a conduit 35 which is in hydraulic communication with conduit 90. In this configuration, no regeneration is being performed and the configuration of the ion exchange system 50 remains in this position until the pair of ion exchange units 10(a), 10(b) which originally occupied the Primary Position becomes exhausted. When that condition occurs, the ion exchange system 50 is reconfigured as shown in FIG. 3.

As set forth in detail in the Examples which follow, it was surprisingly discovered that by placing two pairs of ion exchange units 10(a), 10(b) and 20(a), 20(b) in parallel in the Primary Position, the total system pressure in the ion exchange system 50 was significantly lowered, thereby allowing the flow through the ion exchange system 50 to substantially increase.

Figure 3:
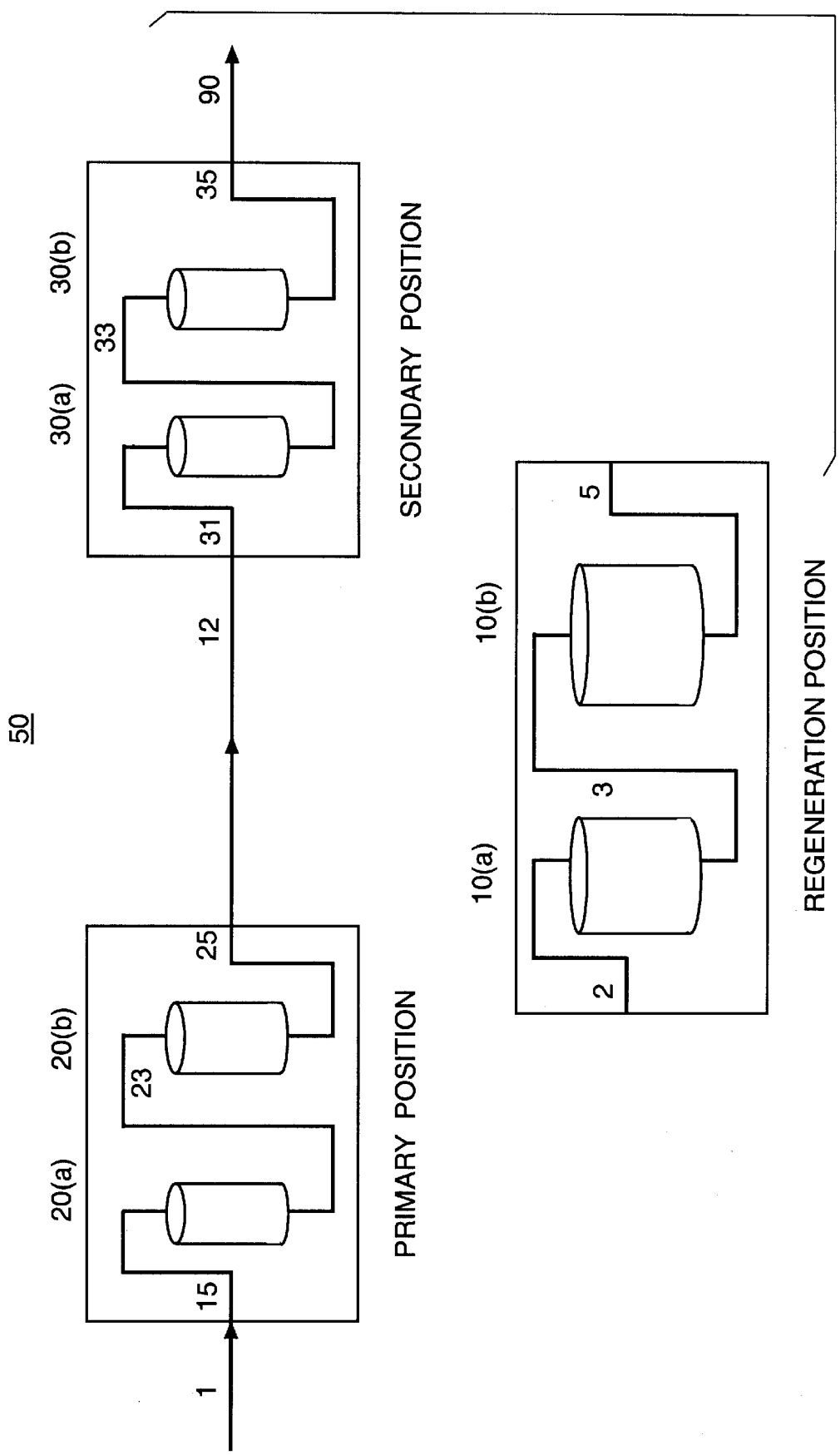
FIG. 3 is a schematic illustration of the ion exchange system configuration of the present invention with the first pair of ion exchange units off-line for regeneration.

Referring now to FIG. 3, when the ion exchange units 10(a),10(b) in the Primary Position become exhausted, the ion exchange system 50 is again reconfigured. Units 10(a) and 10(b) are removed from service and placed off-line for regeneration in the Regeneration Position leaving only ion exchange pair 20(a) and 20(b) in the Primary position. The flow of the liquor 1 is now no longer is split in parallel between two pairs of units 10(a), 10(b) and 20(a), 20(b) in the Primary Position but instead is solely fed, under pressure, to cation exchange unit 20(a) by means of conduit 15. The liquor exits cation ion exchange unit 20(a) by means of a conduit 23 and is conveyed by conduit 23 to anion ion exchange unit 20(b) which is connected in series to unit 20(a). The liquor, with some quantity of impurities removed, exits unit 20(b) by means of conduit 25 where it flows, under pressure, into conduit 12 and then into conduit 31 whereby it is conveyed into cation exchange unit 30(a) which, along with unit 30(b), occupies the Secondary Position. The liquor then flows through unit 30(a) into conduit means 33 and is fed into anion ion exchange unit 30(b) by means of conduit 33. The liquor, now in the form of a desirable end product, then exits unit 30(b) by means of conduit 35 which is connected to conduit 90.

Figure 4:
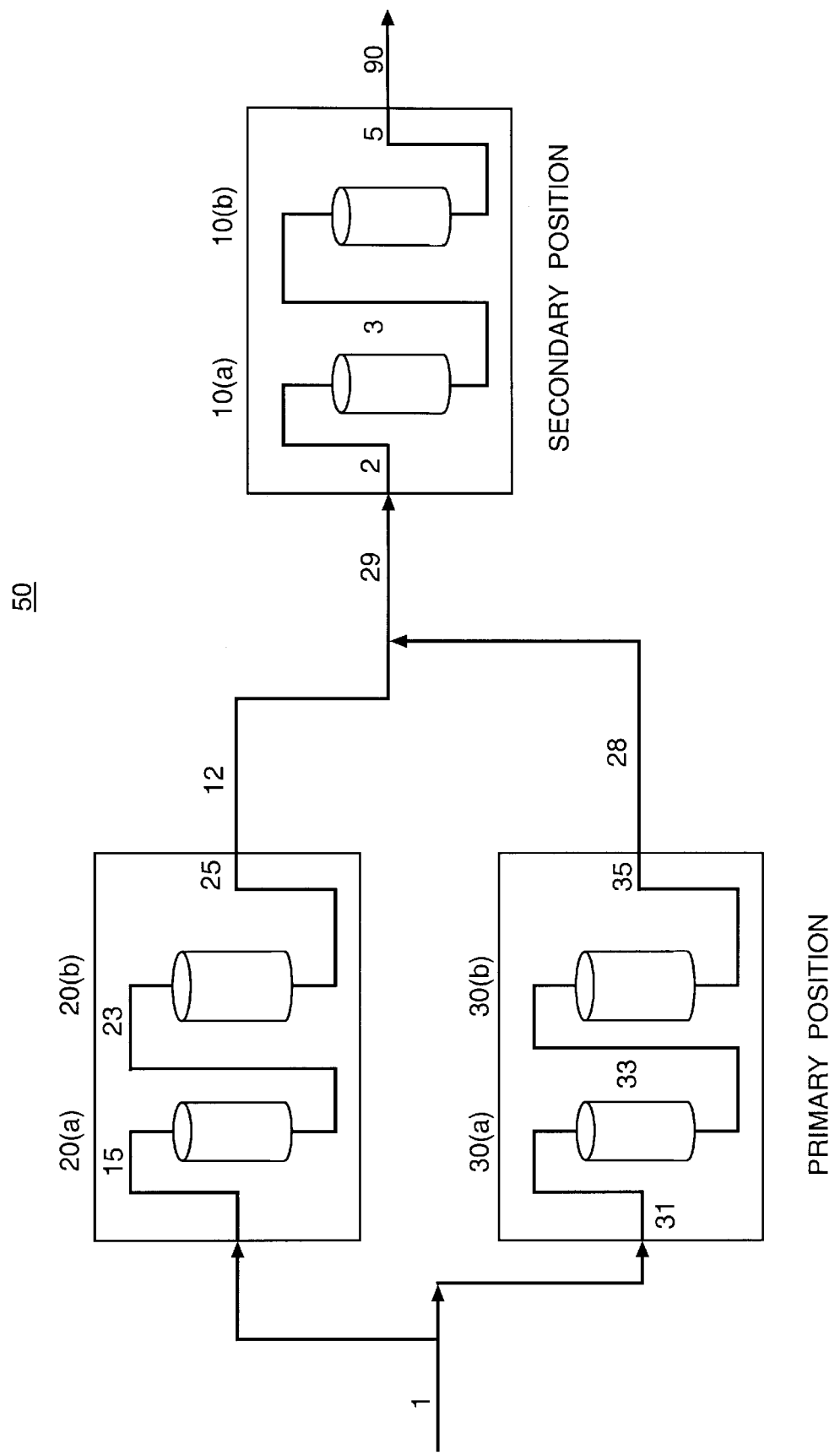
FIG. 4 is a schematic illustration of the ion exchange system configuration of the present invention with the second and third pairs of ion exchange units operated in parallel and the first pair of ion exchange units returned to service.

The ion exchange system 50 is operated in this manner until the regeneration of units 10(a) and 10(b) is complete at which time units 10(a), 10(b) are placed in the Secondary Position and the pair of ion exchange units 30(a), 30(b) formerly in the Secondary Position are moved into the Primary Position where they operate in parallel with the ion exchange units 20(a),20(b) already in the Primary Position. Thus, the ion exchange system 50 is reconfigured in a manner illustrated in FIG. 4.

Figure 5:
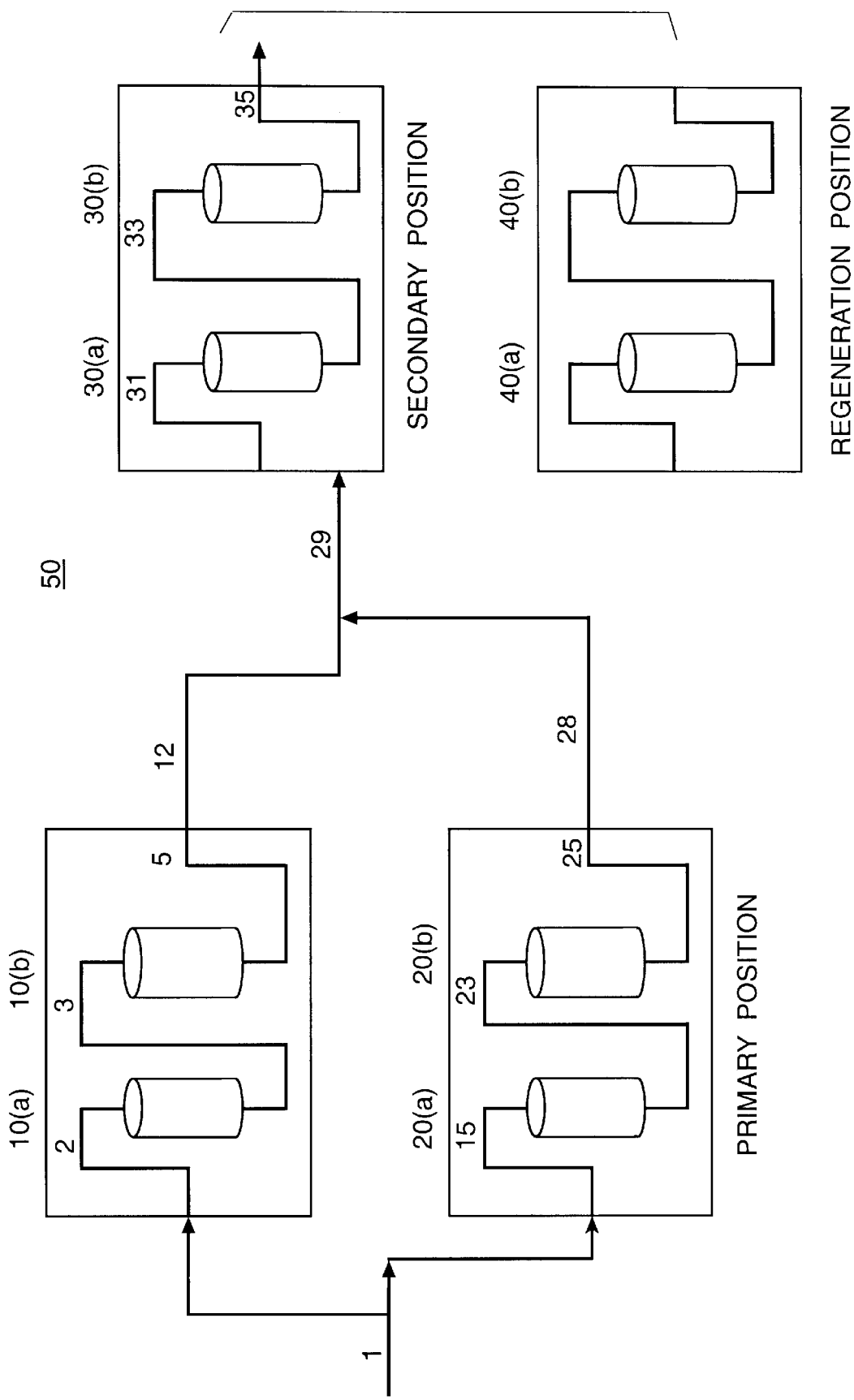
FIG. 5 is a schematic illustration of an additional embodiment of the ion exchange system of the present invention with a fourth pair of ion exchange units.

In another embodiment of the present invention, illustrated in FIG. 5, an additional ion exchange unit pair 40(a), 40(b) is introduced to the ion exchange system 50 so that one pair of ion exchange units is always off-line being regenerated and subsequently held off-line when regeneration is complete until the ion exchange unit pair which has operated the longest time in the Primary Position becomes exhausted. At that time the ion exchange unit pair in the Regeneration Position is placed in the Secondary Position, the units in the Secondary Position are moved to the Primary Position and the ion exchange unit pair in the Primary Position requiring regeneration is taken off-line and placed in the Regeneration Position. The effect is that two pairs of ion exchange units will always operate in parallel in the Primary Position followed in series by a single pair of ion exchange units in the Secondary Position.

The system and method according to this invention is described in a more detailed manner by the following examples.

EXAMPLE 1

The ion exchange system 50 was initially configured in the manner illustrated in FIG. 1. A fructose supply liquor 1 was fed into cation exchange unit 10(a) under a pressure of about 120 pounds per square inch (gauge) ("PSIG") and at a flow rate of about 360 gallons per minute ("GPM"). At this flowrate a pressure drop of about 50 PSIG was measured across ion exchange units 10(a), 10(b) in the Primary Position. An additional pressure drop of about 50 PSIG was measured across those ion exchange units 20(a), 20(b) in the Secondary Position. Thus, the total pressure drop across the entire ion exchange system 50, exclusive of pressure losses attributable to inlet line 2 and conduits 5, 12, 15, 25 and 90 was about 100 PSIG. The pair of ion exchange units 30(a), 30(b) in the Regeneration Position required about 10 to 12 hours to be regenerated. After regeneration of units 30(a) and 30(b) was complete, the ion exchange system 50 was reconfigured in the manner illustrated in FIG. 2. By placing units 20(a) and 20(b) in parallel with units 10(a) and 10(b) in the Primary Position, it was surprisingly discovered that the supply liquor 1 was able to be fed into ion exchange unit 10(a) at a rate of about 240 GPM and into ion exchange unit 20(a) at a rate of about 240 GPM. A flowrate of about 480 GPM was able to be fed into units 30(a), 30(b) in the Secondary Position for a total flowrate through the ion exchange system 50 of about 480 GPM. This flowrate was able to be sustained for about 27 hours. At these flowrates, the pressure drop across units 10(a), 10(b) was about 22 PSIG, the pressure drop across units 20(a), 20(b) was measured at about 23 PSIG, and the pressure drop across units 30(a), 30(b) in the Secondary Position was about 57 PSIG for a total pressure drop across the ion exchange system 50 of about 80 PSIG exclusive of pressure losses attributable to inlet line 2 and conduits 5, 12, 15, 25, 28, 29, 31, 35 and 90. At these flowrates, no detrimental effects to the quality of the finished product in conduit 90 were observed. Because the supply liquor 1 was fed to units 10(a) and 20(a) in the Primary Position at a flowrate of about 240 GPM instead of about 360 GPM, the contact time between the liquor and the ion exchange resin in units 10(a), 10(b), 20(a) and 20(b) was increased with a resulting improvement in the efficiency of impurity adsorption.

EXAMPLE 2

The ion exchange system 50 was initially configured in the manner illustrated in FIG. 1. A fructose supply liquor 1 was fed into cation exchange unit 10(a) under a pressure of about 120 PSIG and at a flow rate of about 360 GPM. At this flowrate a pressure drop of about 50 PSIG was measured across ion exchange units 10(a), 10(b) in the Primary Position. An additional pressure drop of about 50 PSIG was measured across those ion exchange units 20(a), 20(b) in the Secondary Position for a total pressure drop across the entire ion exchange system 50 of about 100 PSIG, exclusive of pressure losses attributable to inlet line 2 and conduits 5, 12, 15, 25 and 90. After regeneration of units 30(a) and 30(b) was complete, the ion exchange system 50 was reconfigured in the manner illustrated in FIG. 2. The flowrate of supply liquor 1 was equally split between units 10(a) and 20(a) which were hydraulically connected in parallel flow operation to one another. Thus, about 180 GPM of supply liquor 1 was fed under pressure into unit 10(a) and about 180 GPM of supply liquor 1 was fed into unit 20(a). Under these operating conditions it was surprisingly discovered that the total amount of time units 30(a) and 30(b) could remain on-line before becoming exhausted was increased from about 50 hours to about 75 hours. This observed increase in operational time of units 30(a) and 30(b) at the same production rate of 360 GPM is attributable to more efficient removal of the impurities due to longer contact time with the ion exchange resin resulting in more impurities being adsorbed per unit volume of resin.

What is claimed is:

1. A method of purifying a liquid in an ion exchange system comprising:
   providing a first pair of ion exchange units with one unit containing cation resin and the other unit containing anion resin said units being connected in series to one another,
   providing a second pair of ion exchange units with one unit containing cation resin and the other unit containing anion resin said units being connected in series to one another and in parallel hydraulic communication with said first pair of ion exchange units,
   providing a third pair of ion exchange units with one unit containing cation resin and the other unit containing anion resin said third pair of units being connected in series to one another and in serial hydraulic communication with said first and second pair of ion exchange units,
   passing said liquid through said first and second pair of ion exchange units to remove impurities from said liquid,
   directing said liquid exiting said first and second pair of ion exchange units into said third pair of ion exchange units to remove additional impurities from said liquid to produce a desirable end product,
   removing said first pair of ion exchange units from service when said cation resin or said anion resin contained in said first pair of ion exchange units is exhausted,
   placing said second pair of ion exchange units and said third pair of ion exchange units in serial hydraulic communication,
   passing untreated liquid through said second pair of ion exchange units and said third pair of ion exchange units to remove impurities from said liquid,
   regenerating said first pair of ion exchange units, and
   returning said regenerated first pair of ion exchange units to service before said second pair of ion exchange units or said third pair of ion exchange units is exhausted and placing said second pair of ion exchange units and said third pair of ion exchange units in parallel hydraulic communication and said regenerated first pair of ion exchange units in serial hydraulic communication with said second and third pairs of ion exchange units.

2. The method of claim 1 wherein the liquid is a sweetener liquor.

3. The method of claim 2 wherein the liquor is a fructose liquor.

4. The method of claim 2 wherein the liquor is a dextrose liquor.

5. The method of claim 2 wherein the liquor is a corn syrup.

6. The method of claim 2 wherein the liquor is a maltodextrin.

7. The method of claim 2 wherein the liquor is a sucrose liquor.

8. A method of purifying a liquid in an ion exchange system comprising:
   providing a first pair of ion exchange units with one unit containing cation resin and the other unit containing anion resin said units being connected in series to one another,
   providing a second pair of ion exchange units with one unit containing cation resin and the other unit containing anion resin said units being connected in series to one another and in parallel hydraulic communication with said first pair of ion exchange units,
   providing a third pair of ion exchange units with one unit containing cation resin and the other unit containing anion resin said third pair of units being connected in series to one another and in serial hydraulic communication with said first and second pair of ion exchange units,
   providing a fourth pair of ion exchange units with one unit containing cation resin and the other unit containing anion resin said fourth pair of units being connected in series to one another,
   passing said liquid through said first and second pair of ion exchange units to remove impurities from said liquid,
   directing said liquid exiting said first and second pair of ion exchange units into said third pair of ion exchange units to remove additional impurities from said liquid and producing a desirable end product,
   removing said first pair of ion exchange units from service when said cation resin or said anion resin contained in said first pair of ion exchange units is exhausted,
   placing said second pair of ion exchange units and said third pair of ion exchange units in parallel hydraulic communication with each other,
   placing said fourth pair of ion exchange units in serial hydraulic communication with said second pair of ion exchange units and said third pair of ion exchange units,
   passing untreated liquid through said second and third pair of ion exchange units to remove impurities from said liquid,
   passing said liquid exiting said second and third pair of ion exchange units into said fourth pair of ion exchange units to remove additional impurities from said liquid and producing a desirable end product, and
   regenerating said first pair of ion exchange units.

9. The method of claim 8 wherein the liquid is a sweetener liquor.

10. The method of claim 9 wherein the liquor is a fructose liquor.

11. The method of claim 9 wherein the liquor is a dextrose liquor.

12. The method of claim 9 wherein the liquor is a corn syrup.

13. The method of claim 9 wherein the liquor is a maltodextrin.

14. The method of claim 9 wherein the liquor is a sucrose liquor.

* * * * *